United States Patent
Zhang et al.

(10) Patent No.: US 12,088,419 B2
(45) Date of Patent: Sep. 10, 2024

(54) FEEDBACK METHOD AND APPARATUS

(71) Applicant: HUAWEI TECHNOLOGIES CO., LTD., Shenzhen (CN)

(72) Inventors: Xingwei Zhang, Lund (SE); Junwei Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 243 days.

(21) Appl. No.: 17/391,168

(22) Filed: Aug. 2, 2021

(65) Prior Publication Data
US 2021/0376968 A1 Dec. 2, 2021

Related U.S. Application Data

(63) Continuation of application No. PCT/CN2020/073643, filed on Jan. 21, 2020.

(30) Foreign Application Priority Data

Feb. 2, 2019 (CN) .......................... 201910108059.5

(51) Int. Cl.
*H04L 1/1829* (2023.01)
*H04L 1/00* (2006.01)
*H04W 92/18* (2009.01)

(52) U.S. Cl.
CPC .......... *H04L 1/1864* (2013.01); *H04L 1/0026* (2013.01); *H04W 92/18* (2013.01)

(58) Field of Classification Search
CPC ... H04L 1/1864; H04L 1/0026; H04L 5/0037; H04L 5/0048; H04L 5/0094;
(Continued)

(56) References Cited

U.S. PATENT DOCUMENTS

2015/0124707 A1 5/2015 Wang et al.
2018/0367261 A1 12/2018 Gonzalves et al.
(Continued)

FOREIGN PATENT DOCUMENTS

CN 103354478 A 10/2013
CN 106470398 A 3/2017
(Continued)

OTHER PUBLICATIONS

Huawei et al. "Sidelink feedback for NR V2X." 3GPP TSG RAN WG1 Meeting #95, R1-1814302, Spokane, USA. Nov. 12-16, 2018. 3 pages.

*Primary Examiner* — Sharmin Chowdhury
(74) *Attorney, Agent, or Firm* — Maier & Maier, PLLC

(57) ABSTRACT

A feedback method and apparatus which are used to provide a feedback mechanism in a sidelink communications system, and may be applied to the internet of vehicles, for example, V2X, LTE-V, and V2V. The method includes: a first terminal device determines that a feedback condition is met, and sends feedback information to a second terminal device, where the feedback information includes at least one of channel state information and a receive response, and the receive response includes a positive acknowledgment, a negative acknowledgment, or discontinuous transmission. In this way, the feedback condition is set, so that the first terminal device sends the feedback information only when the feedback condition is met. In this way, resource overheads and information redundancy that are caused when each terminal device in a communication group sends feedback information are effectively avoided.

18 Claims, 4 Drawing Sheets

(58) Field of Classification Search
CPC . H04L 25/0202; H04L 1/0009; H04L 1/0015; H04L 1/0031; H04L 1/1671; H04L 1/1685; H04L 1/1861; H04L 5/0055; H04L 5/0057; H04L 1/0003; H04L 1/1607; H04W 92/18; H04W 4/46; H04W 76/28; H04W 28/04; H04W 4/40; H04W 4/70; H04W 72/20; H04W 72/23
See application file for complete search history.

(56) References Cited

U.S. PATENT DOCUMENTS

| | | | | |
|---|---|---|---|---|
| 2019/0123881 | A1* | 4/2019 | Lee | H04L 1/1822 |
| 2019/0349121 | A1* | 11/2019 | Tian | H04L 1/1671 |
| 2020/0305176 | A1* | 9/2020 | Hu | H04B 7/0626 |
| 2021/0099213 | A1* | 4/2021 | Chen | H04L 1/0009 |
| 2021/0168648 | A1* | 6/2021 | Lee | H04W 4/40 |
| 2021/0314933 | A1* | 10/2021 | Zhang | H04W 4/30 |
| 2021/0377912 | A1* | 12/2021 | El Hamss | H04L 1/1854 |
| 2022/0045800 | A1* | 2/2022 | Chen | H04L 1/1896 |

FOREIGN PATENT DOCUMENTS

| | | |
|---|---|---|
| CN | 108400843 A | 8/2018 |
| CN | 108847875 A | 11/2018 |
| WO | 2018084608 A2 | 5/2018 |

\* cited by examiner

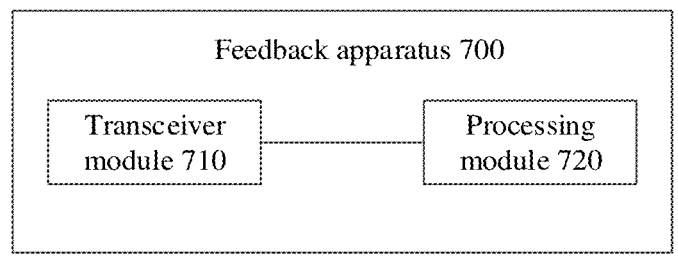
FIG. 6
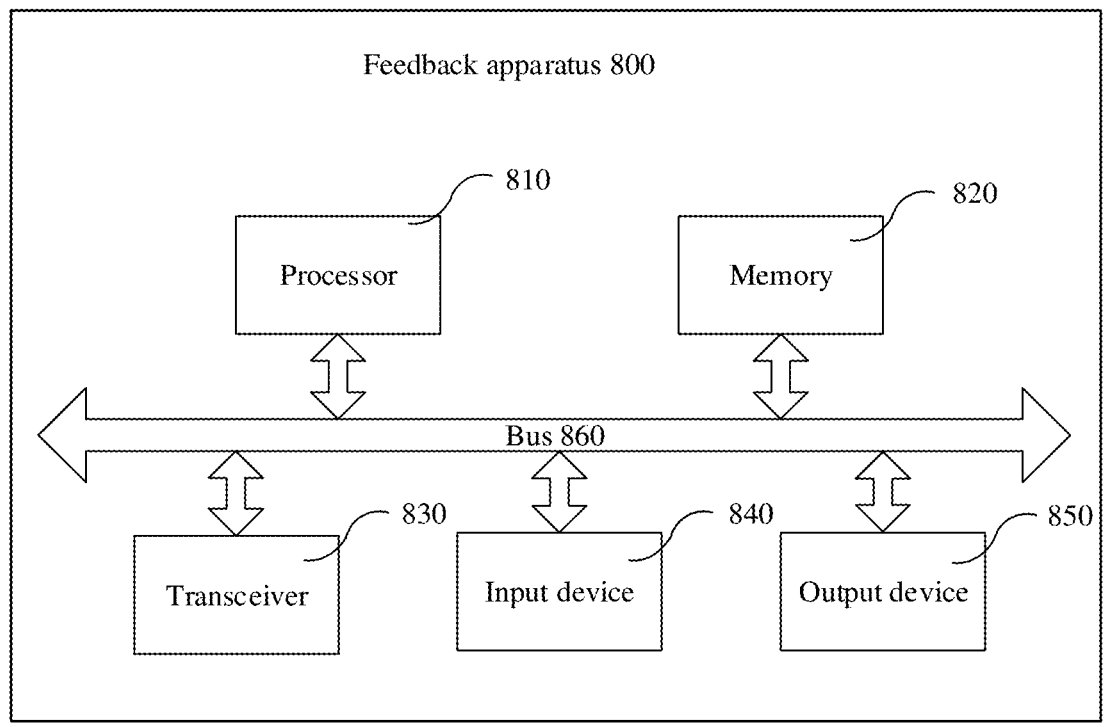
FIG. 7
FIG. 8

FEEDBACK METHOD AND APPARATUS

CROSS-REFERENCE TO RELATED APPLICATIONS

This application is a continuation of International Application No. PCT/CN2020/073643, filed on Jan. 21, 2020, which claims priority to Chinese Patent Application No. 201910108059.5, filed on Feb. 2, 2019. The disclosures of the aforementioned applications are hereby incorporated by reference in their entireties.

TECHNICAL FIELD

The embodiments relate to the field of communications technologies, and in particular, to a feedback method and apparatus.

BACKGROUND

With development of communications technologies, the 3rd generation partnership project (3GPP) proposes a vehicle to everything (V2X) technology based on a cellular network. V2X is a next-generation information communications technology that can connect a vehicle to all things, and as shown in FIG. 1, there are a plurality of application scenarios such as vehicle-to-vehicle (V2V) communication, vehicle to pedestrian (V2P) communication, vehicle-to-infrastructure (V2I) communication, and vehicle to network (V2N) communication.

In the V2X communications system, terminal devices may directly communicate with each other by using a direct communication link (also referred to as a sidelink, a sidelink, a secondary link, or the like), and there is no need to perform forwarding through a network. However, because a broadcast or multicast mechanism is used for communication between the terminal devices, a plurality of receiving terminal devices simultaneously receive a signal sent by a same sending terminal device. In this scenario, there is no related solution about how the receiving terminal devices send feedback information. If a method that all the receiving terminals send feedback information in long term evolution (LTE) is directly used, feedback information overheads are very high, and transmission resources are wasted.

SUMMARY

The embodiments provide a feedback method and apparatus, to implement a feedback mechanism in a V2X communications system and save transmission resources.

According to a first aspect, an embodiment provides a feedback method, applied to a first terminal device. The method includes:

determining that a feedback condition is met; and sending feedback information to a second terminal device or a network device, where the feedback information includes at least one of channel state information and a receive response, and the receive response includes a positive acknowledgment, a negative acknowledgment, or discontinuous transmission.

According to the solution provided in this embodiment, the feedback condition is set, so that the first terminal device sends the feedback information only when the feedback condition is met. In this way, only some terminal devices that meet the feedback condition can be controlled to send the feedback information, and not all the first terminal devices need to send the feedback information. This effectively avoids resource overheads and information redundancy caused when all the first terminal devices send the feedback information.

In a possible design, the feedback condition includes at least one of the following conditions: first channel state information is less than or equal to a first threshold, where the first channel state information is a channel quality indicator (CQI), reference signal received power (RSRP), or reference signal received quality (RSRQ); second channel state information is greater than or equal to a second threshold, where the second channel state information is a path loss or a distance; a latest sent receive response is a negative acknowledgment, or a negative acknowledgment is sent within first duration before the feedback information is sent; first indication information is received from the second terminal device or the network device, where the first indication information is used to indicate that data currently sent by the second terminal device is retransmission data, or the first indication information is used to indicate that data currently sent by the network device is retransmission data, or the first indication information is used to indicate a quantity of times of repeated transmission; second indication information is received from the second terminal device or the network device, where the second indication information is used to indicate a reserved transmission resource; and third indication information is received from the network device or a third terminal device, where the third indication information is used to indicate a transmission resource used by the second terminal device to send data.

In this way, the feedback condition provided in this embodiment may have a plurality of possible implementations. This effectively improves data transmission efficiency in a sidelink communications system and enhances applicability of the feedback method.

In a possible design, the first threshold and/or the second threshold are/is configured by the network device or the second terminal device, or the first threshold and/or the second threshold are/is pre-configured.

In a possible design, the feedback information includes the receive response. Before the sending feedback information to a second terminal device or a network device, the method includes: receiving first data from the second terminal device or the network device. The sending feedback information to a second terminal device or a network device includes: when the first data is successfully received, sending a positive acknowledgment to the second terminal device or the network device; or when the first data is not successfully received, sending a negative acknowledgment to the second terminal device or the network device; or when the first data is not successfully received, sending discontinuous transmission to the second terminal device or the network device.

In this way, according to the solution provided in this embodiment, the second terminal device may determine, based on the receive response fed back by the first terminal device, whether to subsequently resend the first data.

In a possible design, the feedback information includes the channel state information. After the sending feedback information to a second terminal device or a network device, the method further includes: receiving data from the second terminal device or the network device, where a modulation and coding scheme of the data is determined based on the channel state information.

In this way, according to the solution provided in this embodiment, the second terminal device may perform link adaptation based on the channel state information fed back by the first terminal device, to select an optimal modulation and coding scheme for subsequent data sending. In this way, a receiving effect of each first terminal device is improved, so that all the first terminal devices can successfully receive data sent by the second terminal device subsequently.

In a possible design, before the sending feedback information to a second terminal device or a network device, the method further includes: receiving fourth indication information from the second terminal device or the network device, where the fourth indication information is used to indicate the first terminal device to send the feedback information when the feedback condition is met.

In this way, according to the solution provided in this embodiment, the network device or the second terminal device may control all receiving terminal devices in a communication group to send the feedback information, or only a receiving terminal device that meets the feedback condition to send the feedback information. If the first terminal device receives the fourth indication information used to indicate a terminal device that meets the feedback condition to send the feedback information, it is determined that the first terminal device needs to determine whether the feedback condition is met, and further determines whether to send the feedback information.

In a possible design, the channel state information includes at least one of the following information: a CQI, a precoding matrix indicator (PMI), a rank indicator (RI), a RSRP, a RSRQ, a path loss, a sounding reference signal (SRS) resource indicator (SRI), a channel state information reference signal (CSI-RS) resource indicator (CRI), a received signal strength indicator (RSSI), a precoding type indicator (PTI), a moving direction of a vehicle, and an interference condition.

According to a second aspect, an embodiment provides a feedback method, applied to a second terminal device. The method includes:
receiving feedback information from at least one terminal device in a first terminal device set, where the feedback information includes at least one of channel state information and a receive response, the receive response includes a positive acknowledgment, a negative acknowledgment, or discontinuous transmission, and the second terminal device and the terminal device in the first terminal device set belong to a same communication group; and sending data to the terminal device in the first terminal device set based on the feedback information.

According to the solution provided in this embodiment, the feedback condition is set, so that the terminal device in the first terminal device set sends the feedback information only when the feedback condition is met. In this way, only some terminal devices that meet the feedback condition can be controlled to send the feedback information, and not all the terminal devices need to send the feedback information. This effectively avoids resource overheads and information redundancy caused when all the terminal devices send the feedback information.

In a possible design, the feedback information includes the receive response; and before the receiving feedback information from at least one terminal device in a first terminal device set, the method further includes: sending first data to the terminal device in the first terminal device set.

In this way, according to the solution provided in this embodiment, the second terminal device may determine, based on the receive response of the terminal device in the first terminal device set for the first data, whether to subsequently resend the first data.

In a possible design, the feedback information includes the channel state information; and the sending data to the terminal device in the first terminal device set includes: determining a modulation and coding scheme of the data based on the channel state information included in the received feedback information, and sending the data to the terminal device in the first terminal device set based on the modulation and coding scheme.

In this way, according to the solution provided in this embodiment, the second terminal device may perform link adaptation based on the channel state information fed back by the first terminal device set, to select an optimal modulation and coding scheme for subsequent data sending. This improves a receiving effect of each terminal device, so that all the terminal devices can successfully receive data sent by the second terminal device subsequently.

In a possible design, the determining a modulation and coding scheme of the data based on the channel state information included in the received feedback information includes: determining the modulation and coding scheme based on worst channel state information or an average value of channel state information included in the received feedback information; or determining the modulation and coding scheme based on worst channel state information or an average value of channel state information included in feedback information that is sent by a terminal device whose latest sent receive response is a negative acknowledgment or who sends a receive response including a negative acknowledgment in previous first duration.

In a possible design, before the receiving feedback information from at least one terminal device in a first terminal device set, the method further includes: sending fourth indication information to the terminal device in the first terminal device set, where the fourth indication information is used to indicate the terminal device to send the feedback information when the feedback condition is met.

In this way, according to the solution provided in this embodiment, the network device or the second terminal device may control all receiving terminal devices in a communication group to send the feedback information, or only some receiving terminal devices that meet the feedback condition to send the feedback information. If the terminal device receives the fourth indication information used to indicate a terminal device that meets the feedback condition to send the feedback information, it is determined that the first terminal device needs to determine whether the feedback condition is met, and further determines whether to send the feedback information.

In a possible design, the channel state information includes at least one of the following information: a CQI, a PMI, a RI, a RSRP, a RSRQ, a path loss, a SRS SRI, a CSI-RS CRI, a RSSI, a PTI, a moving direction of a vehicle, and an interference condition.

According to a third aspect, an embodiment provides a feedback method, applied to a first terminal device. The method includes:
receiving fifth indication information from a second terminal device, where the fifth indication information is used to trigger feedback information; determining that the fifth indication information includes an identifier of the first terminal device; and sending the feedback information to the second terminal device in response to the fifth indication information, where the feedback information includes at least one of channel state information and a receive response, and the receive response includes a positive acknowledgment, a negative acknowledgment, or discontinuous transmission.

In this way, according to the solution provided in this embodiment, when receiving the fifth indication information sent by the second terminal device, and the fifth indication information includes the identifier of the first terminal device, the first terminal device may determine that the first terminal device needs to send the feedback information. In this way, the second terminal device may clearly indicate, by using the fifth indication information, the terminal device that needs to send the feedback information. This effectively avoids resource overheads and information redundancy caused when all terminal devices in a communication group send the feedback information.

In a possible design, the fifth indication information includes a transmission resource used to send the feedback information.

In a possible design, the feedback information includes the receive response. Before the sending feedback information to the second terminal device, the method further includes: receiving first data from the second terminal device. The sending feedback information to the second terminal device includes: sending a positive acknowledgment to the second terminal device when the first data is successfully received; sending a negative acknowledgment to the second terminal device when the first data is not successfully received; or sending discontinuous transmission to the second terminal device when the first data is not successfully received.

In this way, according to the solution provided in this embodiment, the second terminal device may determine, based on the receive response fed back by the first terminal device, whether to subsequently resend the first data.

In a possible design, the feedback information includes the channel state information. After the sending feedback information to the second terminal device, the method further includes: receiving data from the second terminal device, where a modulation and coding scheme of the data is determined based on the channel state information.

In this way, according to the solution provided in this embodiment, the second terminal device may perform link adaptation based on the channel state information fed back by the first terminal device, to select an optimal modulation and coding scheme for subsequent data sending. This improves a receiving effect of each terminal device, so that all receiving terminal devices in a communication group can successfully receive data sent by the second terminal device subsequently.

In a possible design, the channel state information includes at least one of the following information: a CQI, a PMI, a RI, RSRP, RSRQ, a path loss, a SRS SRI, a CSI-RS CRI, a RSSI, a PTI, a moving direction of a vehicle, and an interference condition.

According to a fourth aspect, an embodiment provides a feedback method, applied to a second terminal device. The method includes:

sending fifth indication information to a terminal device in a first terminal device set, where the fifth indication information includes an identifier of each of at least one terminal device in the first terminal device set, and the fifth indication information is used to trigger the at least one terminal device to send feedback information; and receiving the feedback information from the at least one terminal device.

In this way, according to the solution provided in this embodiment, the second terminal device may clearly indicate, by sending the fifth indication information, the terminal device that needs to send the feedback information, and the terminal device that needs to send the feedback information may be at least one terminal device in the first terminal device set. Therefore, this effectively avoids resource overheads and information redundancy that are caused when all receiving terminal devices in the communication group send feedback information.

In a possible design, the fifth indication information includes a transmission resource used to send the feedback information.

In a possible design, the sending fifth indication information to a terminal device in a first terminal device set includes: broadcasting the fifth indication information, or separately sending the fifth indication information to the at least one terminal device.

In a possible design, the feedback information includes a receive response; and before the receiving the feedback information from the at least one terminal device, the method further includes: sending first data to the terminal device in the first terminal device set.

In this way, according to the solution provided in this embodiment, the second terminal device may determine, based on the receive response fed back by the at least one terminal device, whether to subsequently resend the first data.

In a possible design, the feedback information includes channel state information; and after the receiving the feedback information from the at least one terminal device, the method further includes: determining a modulation and coding scheme of data based on the channel state information included in the received feedback information, and sending the data to the first terminal device in the first terminal device set based on the modulation and coding scheme.

In this way, according to the solution provided in this embodiment, the second terminal device may perform link adaptation based on the channel state information fed back by the terminal device in the first terminal device set, to select an optimal modulation and coding scheme for subsequent data sending. This improves a receiving effect of each terminal device, so that all the terminal devices can successfully receive data sent by the second terminal device subsequently.

In a possible design, determining a modulation and coding scheme of data based on the channel state information included in the received feedback information includes: determining the modulation and coding scheme based on worst channel state information or an average value of channel state information included in the received feedback information; or determining the modulation and coding scheme based on worst channel state information or an average value of channel state information included in feedback information that is sent by a terminal device whose latest sent receive response is a negative acknowledgment or who sends a receive response including a negative acknowledgment in previous first duration.

In a possible design, before the sending fifth indication information to a terminal device in a first terminal device set, the method further includes: determining the at least one terminal device, where the at least one terminal device is a terminal device that is in the first terminal device set and whose first channel state information is less than or equal to a first threshold, and the first channel state information is a CQI, RSRP, or RSRQ; or the at least one terminal device is a terminal device that is in the first terminal device set and whose second channel state information is greater than or equal to a second threshold, where the second channel state information is a path loss or a distance; or the at least one terminal device is a terminal device in the first terminal device set, where an absolute value of a difference between channel state information of the terminal device and average channel state information is less than or equal to a third threshold; or the at least one terminal device is a terminal device that is in the first terminal device set and whose sent receive response is a negative acknowledgment or discontinuous transmission.

In a possible design, the channel state information includes at least one of the following information: a CQI, a PMI, a RI, a RSRP, a RSRQ, a path loss, a SRS SRI, a CSI-RS CRI, a RSSI, a PTI, a moving direction of a vehicle, and an interference condition.

According to a fifth aspect, an embodiment provides a feedback apparatus. The feedback apparatus has a function of implementing the first terminal device in the first aspect or any possible design of the first aspect, or has a function of the first terminal device in the third aspect or any possible design of the third aspect. The function may be implemented by hardware, or may be implemented by hardware by executing corresponding software. The hardware or the software includes one or more modules corresponding to the foregoing function.

In a possible design, a structure of the feedback apparatus includes a processing module and a transceiver module. The processing module is configured to support the feedback apparatus in performing a corresponding function in the first aspect or any design of the first aspect, performing a corresponding function in the third aspect or any design of the third aspect. The transceiver module is configured to support communication between the feedback apparatus and another communications device, for example, receive an indication or data sent by a network device. The feedback apparatus may further include a storage module. The storage module is coupled to the processing module, and stores a program instruction and data that are necessary for the feedback apparatus. In an example, the processing module may be a processor, the communications module may be a transceiver, and the storage module may be a memory. The memory may be integrated with the processor, or may be disposed separately from the processor, though this is not limited in the embodiment.

According to a sixth aspect, an embodiment provides a chip. The chip is coupled to a memory, and is configured to read and execute a software program stored in the memory, to implement the method in any possible design in the first aspect or implement the method in any possible design in the third aspect.

According to a seventh aspect, an embodiment provides a computer-readable storage medium. The computer storage medium stores computer-readable instructions. When a computer reads and executes the computer-readable instructions, the computer is enabled to perform the method in any possible design in the first aspect or perform the method in any possible design in the third aspect.

According to an eighth aspect, an embodiment provides a computer program product. When a computer reads and executes the computer program product, the computer is enabled to perform the method in any possible design in the first aspect or perform the method in any possible design in the third aspect.

According to a ninth aspect, an embodiment provides a feedback apparatus. The feedback apparatus has a function of implementing the second terminal device in the second aspect or any possible design of the second aspect, or has a function of the second terminal device in the fourth aspect or any possible design of the fourth aspect. The function may be implemented by hardware, or may be implemented by hardware by executing corresponding software. The hardware or the software includes one or more modules corresponding to the foregoing function.

In a possible design, a structure of the feedback apparatus includes a processing module and a transceiver module. The processing module is configured to support the feedback apparatus in performing a corresponding function in the second aspect or any design of the second aspect, performing a corresponding function in the fourth aspect or any design of the fourth aspect. The transceiver module is configured to support communication between the feedback apparatus and another communications device, for example, receive an indication or data sent by a network device. The feedback apparatus may further include a storage module. The storage module is coupled to the processing module, and stores a program instruction and data that are necessary for the feedback apparatus. In an exemplary embodiment, the processing module may be a processor, the communications module may be a transceiver, and the storage module may be a memory. The memory may be integrated with the processor, or may be disposed separately from the processor, though this is not limited.

According to a tenth aspect, an embodiment provides a chip. The chip is coupled to a memory, and is configured to read and execute a software program stored in the memory, to implement the method in any possible design in the first aspect or implement the method in any possible design in the fourth aspect.

According to an eleventh aspect, an embodiment provides a computer-readable storage medium. The computer storage medium stores computer-readable instructions. When a computer reads and executes the computer-readable instructions, the computer is enabled to perform the method in any possible design in the first aspect or perform the method in any possible design in the fourth aspect.

According to a twelfth aspect, an embodiment provides a computer program product. When a computer reads and executes the computer program product, the computer is enabled to perform the method in any possible design in the first aspect or perform the method in any possible design in the fourth aspect.

BRIEF DESCRIPTION OF DRAWINGS

FIG. 6 shows an implementation of fifth indication information according to an embodiment;

FIG. 7 is a schematic structural diagram of a feedback apparatus according to an embodiment; and FIG. 8 is another schematic structural diagram of a feedback apparatus according to an embodiment.

DETAILED DESCRIPTION OF THE EMBODIMENTS

Figure 1:
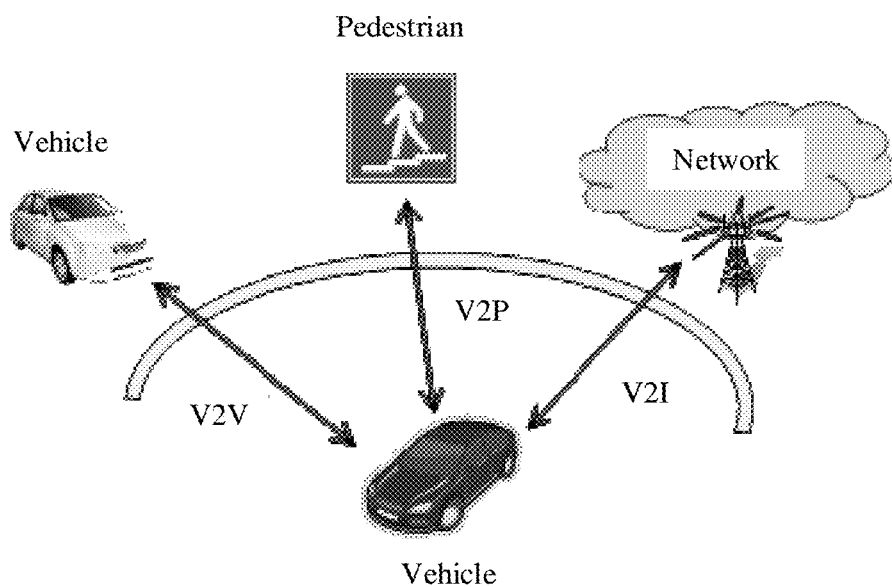
FIG. 1 is a schematic diagram of an application scenario of a V2X technology.

To make the objectives, solutions, and advantages of the embodiments clearer, the following further describes the embodiments in detail with reference to the accompanying drawings.

In the following, some terms of the embodiments are described, so as to help a person of ordinary skill in the art have a better understanding.

(1) A terminal device may also be referred to as user equipment, a mobile station, a mobile terminal (MT), or the like, and is a device that provides voice and/or data connectivity for a user. The terminal device may communicate with a core network through a radio access network (RAN), and exchange voice and/or data with the RAN. For example, the terminal device may be a handheld device or a vehicle-mounted device with a wireless connection function. Currently, for example, the terminal device is a mobile phone, a tablet computer, a notebook computer, a palmtop, a mobile internet device (MID), a wearable device, a virtual reality (VR) device, an augmented reality (AR) device, a wireless terminal in industrial control, a wireless terminal in self-driving, a wireless terminal in a remote surgery, a wireless terminal in a smart grid, a wireless terminal in transportation safety, a wireless terminal in a smart city, or a wireless terminal in a smart home.

(2) A network device is a device that is in a network and that is configured to connect the terminal device to a wireless network. The network device may be a node in a RAN, and may also be referred to as a base station or a RAN node (or device). The network device may be configured to mutually convert a received over-the-air frame and an Internet Protocol (IP) packet and serve as a router between the wireless terminal and a rest portion of the access network, where the rest portion of the access network may include an IP network. The network device may coordinate attribute management of the air interface. For example, the network device may include an evolved NodeB (NodeB, eNB, or e-NodeB) in a LTE system or an LTE-advanced (LTE-A) system, or may include a next generation node B (gNB) in a 5G NR system, or may include a transmission reception point (TRP), a home evolved NodeB (HNB), a base band unit (BBU), a Wi-Fi access point (AP), or the like, or may include a centralized unit (CU) and a distributed unit (DU) in a cloud radio access network (CloudRAN) system. This is not limited in this embodiment. For another example, a network device in a V2X technology is a road side unit (RSU). The RSU may be a fixed infrastructure entity supporting a V2X application, and may exchange a message with another entity supporting the V2X application.

(3) A sidelink (sidelink, SL) may also be referred to as a sidelink, a secondary link, a device to device (D2D) communication link, a sidelink, or the like, and is used for communication between terminal devices. The SL communication may use at least one of the following channels: a physical sidelink shared channel (PSSCH), used to carry data (data); a physical sidelink control channel (physical sidelink control channel, PSCCH), used to carry sidelink control information (SCI), where the SCI is also referred to as scheduling assignment; and a physical sidelink discovery channel (PSDCH), used to carry device discovery information.

(4) The terms "system" and "network" may be used interchangeably in the embodiments. The term "a plurality of" means two or more than two. In view of this, "a plurality of" can be understood as "at least two" in the embodiments. The term "at least one" may be understood as one or more, for example, understood as one, two, or more. For example, "include at least one" means including one, two, or more, and does not limit which items are included. For example, if "include at least one of A, B, and C", A, B, C, A and B, A and C, B and C, or A and B and C may be included. Similarly, an understanding of descriptions such as "at least one type" is similar. The term "and/or" describes an association relationship for describing associated objects and represents that three relationships may exist. For example, A and/or B may represent the following three cases: Only A exists, both A and B exist, and only B exists. In addition, the character "/" generally indicates an "or" relationship between the associated objects.

Unless otherwise stated on the contrary, ordinal numerals such as "first" and "second" in the embodiments are used to distinguish between a plurality of objects, and are not intended to limit a sequence, a time sequence, a priority, or an importance degree of the plurality of objects.

The solutions provided in the embodiments may be applied to a 5G system, or applied to a future communications system or another similar communications system. In addition, the solutions provided in the embodiments may be applied to a cellular link, or may be applied to a link between devices, for example, a D2D link. The D2D link or a V2X link may also be referred to as a sidelink, a secondary link, a sidelink, or the like. In the embodiments, the foregoing terms all refer to links established between devices of a same type, and have a same meaning. The device of the same type may be a link between terminal devices, or may be a link between base stations, or may be a link between relay nodes, or the like. This is not limited in this embodiment. For the link between the terminal devices, there is a D2D link defined in 3GPP Release (Rel)-12/13, and there is also a V2X link defined by 3GPP for the internet of vehicles from a vehicle to a vehicle, from a vehicle to a mobile phone, or from a vehicle to any entity, including Rel-14/15. A V2X link based on the NR system in Rel-16 and later releases which are currently being researched by 3GPP is also included.

Figure 2:
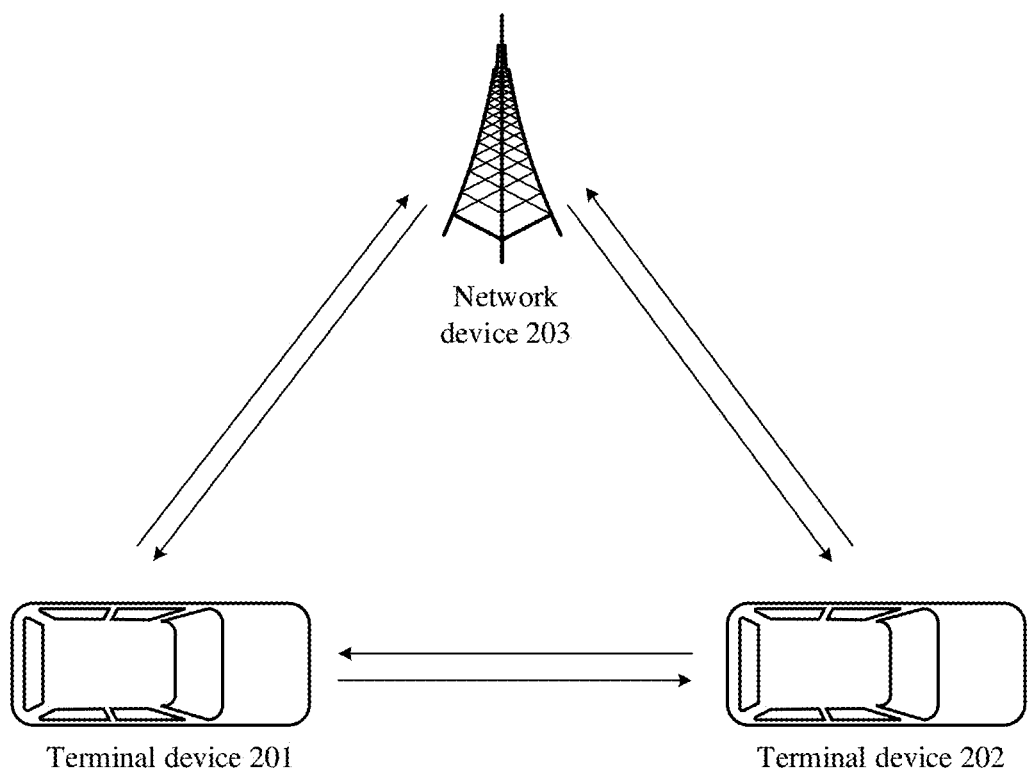
FIG. 2 is a schematic diagram of a network architecture of a communications system to which an embodiment is applicable.

FIG. 2 shows an example of a communications system according to an embodiment. The communications system may be a sidelink communications system or a V2X communications system. As shown in FIG. 2, the communications system includes a terminal device 201 and a terminal device 202. The communications system may further include a network device 203, configured to provide timing synchronization and resource scheduling for terminal devices (for example, the terminal devices 201 and 202) that communicate with the network device 203.

In this embodiment, the terminal device 201 is a receiving terminal device, and the terminal device 202 is a sending terminal device. The terminal device 201 may directly communicate with the terminal device 202 by using a sidelink. The terminal device 201 and the terminal device 202 may further communicate with the network device 203 by using an uplink and a downlink. This is not limited in the embodiment. Although FIG. 2 shows only one terminal device 201 and one terminal device 203, it may be understood that in actual application, the communications system may further include another terminal device. For example, the terminal device 201, the terminal device 202, and another terminal device may form a communication group. In the communication group, only one terminal device can be a sending terminal device at a same moment. In addition to the sending terminal device, all other terminal devices in the communication group are receiving terminal devices. The sending terminal device may send data or signaling to each receiving terminal device in the communication group in a broadcast or multicast manner. Likewise, in actual application, the network device may provide a service for a plurality of terminal devices (including the terminal devices 201 and 202).

The network device in FIG. 2 may be an access network device, for example, a base station. The access network device corresponds to different devices in different systems. For example, the access network device may correspond to an eNB in a 4th generation mobile communication technology (4G) system, and correspond to a 5G access network device, such as a gNB, in a 5G system. An example in which the terminal device in FIG. 2 is a vehicle-mounted terminal device or a vehicle is used. However, it may be understood that the terminal device in the embodiments is not limited thereto.

Figure 3:
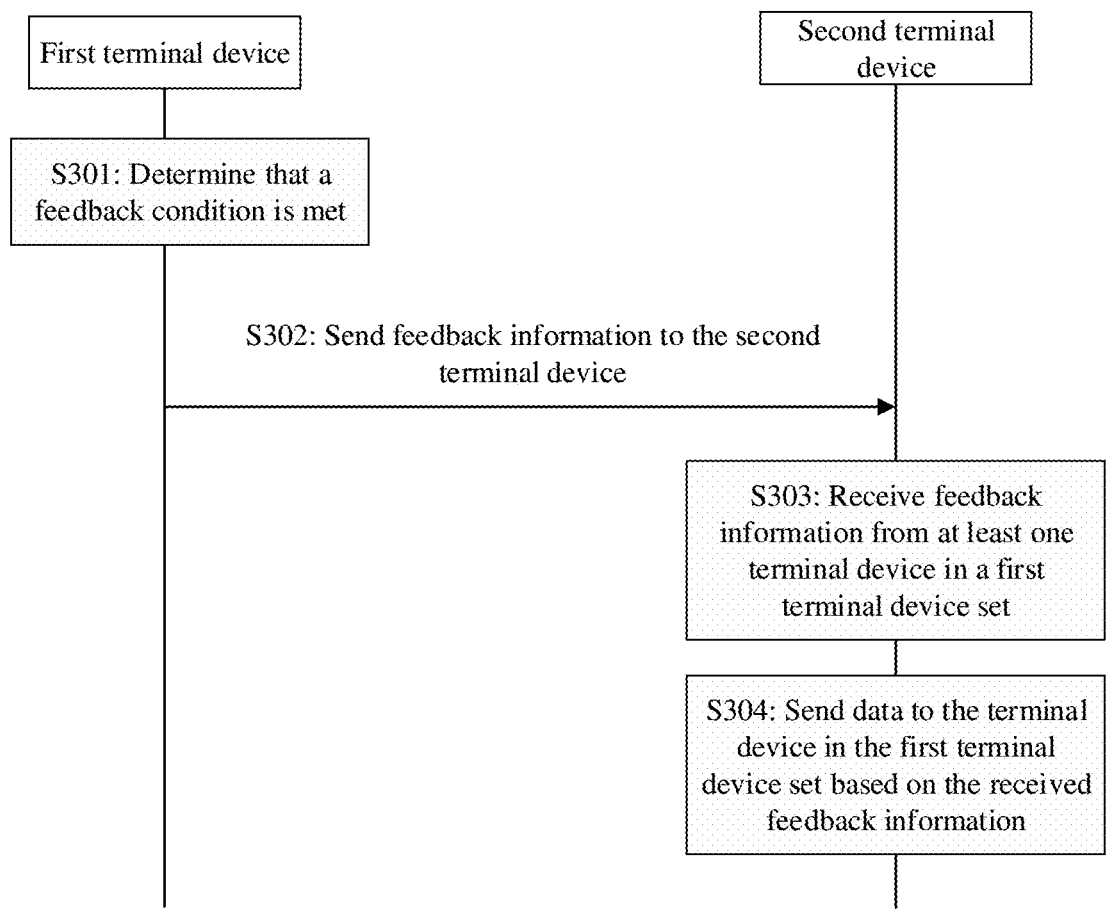
FIG. 3 is a schematic flowchart of a feedback method according to an embodiment.

Based on the foregoing network architecture, FIG. 3 shows an example of a feedback method according to an embodiment. As shown in FIG. 3, the method may include the following step S301 to step S304.

Before step S301 is performed, a first terminal device may receive first data sent by a second terminal device or a network device. The first terminal device may determine, based on a channel state obtained through measurement in a process of receiving the first data and based on a plurality of factors such as a state of the first terminal device, whether the first terminal device meets a feedback condition, and determine whether to send feedback information. If the feedback condition is not met, the feedback information is not sent.

Step 301: The first terminal device determines that the feedback condition is met.

In a possible design, the first terminal device may be a receiving terminal device that is applied to a multicast scenario and that meets the feedback condition. A communication group to which the first terminal device belongs may further include one sending terminal device and one or more other receiving terminal devices. Certainly, the communication group may include only one receiving terminal device, namely, the first terminal device. This is not limited in the embodiment. In this embodiment, the sending terminal device in the communication group is referred to as the second terminal device, a set of all terminal devices in the communication group is referred to as a first terminal device set, and the first terminal device has a same group identifier as the second terminal device and another receiving terminal device in the communication group. Still further, at least one terminal device in the first terminal device set may meet the feedback condition, and the at least one terminal device includes but is not limited to the first terminal device.

The feedback condition in this embodiment may include at least one of the following conditions:

(1) First channel state information is less than or equal to a first threshold.

A smaller value of the first channel state information indicates a poorer channel condition. If the first terminal device determines that the first channel state information of the first terminal device is less than or equal to the first threshold, the first terminal device may determine that the first terminal device meets the feedback condition. In this, the first channel state information may be, for example, a parameter used to indicate a channel state condition of a channel between the first terminal device and the second terminal device or between the first terminal device and the network device, for example, a CQI, RSRP, RSRQ, or a RSSI. It may be understood that when the first channel state information is different parameters, first thresholds corresponding to the parameters may be the same or may be different. This is not limited in the embodiments.

If the first terminal device finds that a CQI between the first terminal device and the second terminal device is less than or equal to a corresponding first threshold, the first terminal device may determine that the feedback condition is met. Alternatively, if the first terminal device finds that RSRP between the first terminal device and the second terminal device is less than or equal to a corresponding first threshold, the first terminal device may determine that the feedback condition is met. Alternatively, if the first terminal device finds that RSRQ between the second terminal devices is less than or equal to a corresponding first threshold, the first terminal device may determine that the first terminal device meets the feedback condition. For example, the first threshold corresponding to the CQI may be 8, and the first threshold corresponding to the RSRP may be 20 dB.

(2) Second channel state information is greater than or equal to a second threshold.

A larger value of the second channel state information indicates a poorer channel condition. If the first terminal device determines that the second channel state information of the first terminal device is greater than or equal to the second threshold, the first terminal device may determine that the first terminal device meets the feedback condition. In this embodiment, the second channel state information may be a parameter used to indicate a channel state/channel interference between the first terminal device and the second terminal device or between the first terminal device and the network device, for example, a distance between the first terminal device and the second terminal device, a path loss, a moving direction of a vehicle, or an interference degree. It may be understood that when the second channel state information is different parameters, second thresholds corresponding to all the parameters may be the same or may be different. This is not limited in the embodiments. It may be understood that when the second channel state information is the path loss, the path loss may be a path loss between the first terminal device and the second terminal device, or may be a path loss between the first terminal device and the network device.

If the first terminal device finds that a distance between the first terminal device and the second terminal device is greater than or equal to a corresponding second threshold, the first terminal device may determine that the first terminal device meets the feedback condition. For example, the second threshold corresponding to the distance may be 1 kilometer.

(3) A latest sent receive response is a negative acknowledgment, or a negative acknowledgment is sent within first duration before the feedback information is sent.

In this embodiment, the second terminal device may send scheduling indication information and data to the first terminal device, and the first terminal device may send a corresponding receiving response to the second terminal device. The receive response may also be referred to as a receive acknowledgment and is used to notify the second terminal device whether the data sent by the second terminal device is successfully received. According to a receiving status of the data, the receiving response may be classified into three types: a positive acknowledgment (ACK), a negative acknowledgment (NACK), and discontinuous transmission (DTX). The ACK indicates that the data is successfully received, the NACK indicates that a scheduling indication is successfully received but the data is not successfully received, and the DTX indicates that the data is missed because the scheduling indication is not successfully received. If the receive response last sent by the first terminal device is the negative acknowledgment, or the negative acknowledgment is sent within the first duration before the determining, it indicates that the first terminal device fails to receive the data, and the channel state may be relatively poor. Therefore, the feedback condition is met. In this embodiment, the first duration may be indicated by the network device or the second terminal device, or may be pre-configured. In the multicast scenario, the latest sent receive response or the receive response sent within the first duration before determining may be a receive response sent by the first terminal device to the second terminal device, or a receive response sent by the first terminal device to another first terminal device in the same communication group. In a broadcast scenario, an object (namely, a feedback object) to which the first terminal device sends the receiving response is not limited in this embodiment.

If the first terminal device feeds back a NACK in a previous hybrid automatic repeat request (HARQ) feedback, the first terminal device may determine that the feedback condition is met. The reason is that feeding back the NACK triggers the second terminal device to resend the data that is not successfully received by the first terminal device. In this case, the first terminal device is enabled to meet the feedback condition, and the feedback information sent by the first terminal device to the second terminal device may be used to determine a modulation and coding scheme (MCS) used for data retransmission. Still further, the first terminal device has previously fed back a NACK, which indicates that a channel condition is poor. In this case, the first terminal device makes the first terminal device meet the feedback condition and sends the feedback information to the second terminal device, so that the second terminal device determines a degree to which the channel condition is poor, and adjusts the MCS of the data, to ensure that the first terminal device can successfully receive the data next time.

(4) First indication information sent by the second terminal device or the network device is received, where the first indication information is used to indicate that the data currently sent by the second terminal device is retransmission data, or the first indication information is used to indicate that the data currently sent by the network device is retransmission data, or the first indication information is used to indicate a quantity of times of repeated transmission.

In this embodiment, the first indication information may be SCI indicating a plurality of times of PSSCH transmission, and the first indication information may be sent in a broadcast form or a multicast form. This is not limited in the embodiments. If the first terminal device receives the first indication information, it indicates that there is still subsequent PSSCH transmission. In this case, the first terminal device is enabled to meet the feedback condition, so that the second terminal device can determine an MCS for subsequent PSSCH transmission.

(5) Second indication information sent by the second terminal device or the network device is received, where the second indication information is used to indicate a transmission resource reserved by the second terminal device.

In this embodiment, the second indication information may be sent by the second terminal device or the network device in a form of broadcast, multicast, unicast, or the like. For example, the second indication information may be SCI indicating a reserved PSSCH transmission resource. If the first terminal device receives the second indication information, it indicates that the second terminal device further performs PSSCH transmission. In this case, the first terminal device sends the feedback information such as the channel state information, which may be used by the second terminal device to determine the MCS for subsequent PSSCH transmission.

(6) Third indication information sent by the network device or the third terminal device is received, where the third indication information is used to indicate a transmission resource that is allocated by the network device to the second terminal device and that is used to send the data.

In this embodiment, the third indication information may be downlink control information (DCI) sent by the network device, and a cyclic redundancy check (CRC) in the DCI is scrambled in a manner in which both the first terminal device and the second terminal device can perform decoding, for example, may be scrambled by using a group-radio network temporary identifier (RNTI), or pair-RNTI. Because the first terminal device is not the sending terminal device, if the first terminal device receives the third indication information sent by the network device, it indicates that the network device allocates the transmission resource to the second terminal device (namely, the sending terminal device), and the second terminal device subsequently needs to perform PSSCH transmission on the allocated transmission resource. In this case, the first terminal device sends the feedback information, for example, the channel state information, which may be used by the second terminal device to determine the MCS for subsequent PSSCH transmission.

It may be understood that each threshold, for example, the first threshold and the second threshold, involved in the foregoing feedback condition, may be configured by the network device or the second terminal device, or may be pre-configured. For example, the network device may notify the first terminal device of the threshold by sending a system broadcast message or radio resource control (RRC) signaling. Alternatively, in another possible implementation, the second terminal device may determine the foregoing thresholds, and notify the first terminal device of the thresholds by delivering indication information through a channel such as a PSCCH, a PSSCH, or a PSBCH or sending sidelink RRC signaling. This is not limited in the embodiments.

The transmission resource in the embodiments may include at least one of the following time domain resources: a frequency domain resource, a code domain resource, a space domain resource, or a power domain resource. This is not limited in the embodiments.

Step 302: The first terminal device sends feedback information to the second terminal device or the network device, where the feedback information includes at least one of channel state information and a receive response, and the receive response includes a positive acknowledgment, a negative acknowledgment, or discontinuous transmission.

In this embodiment, when determining that the feedback condition is met, the first terminal device may send the feedback information to the second terminal device or the network device, and when determining that the feedback condition is not met, the first terminal device does not send the feedback information. Alternatively, it may be understood that the first terminal device that meets the feedback condition is considered as the first terminal device that needs to send the feedback information, and the first terminal device that does not meet the feedback condition does not need to send the feedback information.

It may be understood that the first terminal device may receive the first data from the second terminal device or the network device, and send the feedback information to the second terminal device or the network device when the feedback condition is met. There are four combination cases in total. In the following embodiment, an example in which the first terminal device receives the first data from the second terminal device, and sends the feedback information to the second terminal device after determining that the feedback condition is met is used for description. However, it may be understood that this embodiment is not limited thereto.

The feedback information sent by the first terminal device may include the receive response and/or channel state information. It may be understood that the feedback information may include only the receive response, or may include only the channel state information, or may include both the receive response and the channel state information. Further, the receive response may be a receive response for the first data previously sent by the second terminal device, and the channel state information may be channel state information of a channel between the first terminal device and the second terminal device.

The receiving response for the first data is used to notify the second terminal device whether the first data previously sent is successfully received by the first terminal device, so that the second terminal device determines whether to subsequently resend the first data or send new data. The channel state information may also be referred to as channel quality information, channel condition information, or the like, and is used by the second terminal device to determine a MCS of data. The channel state information indicates a channel condition between the first terminal device and the second terminal device. In view of this, after sending the feedback information, the first terminal device may further receive data sent by the second terminal device by using the determined MCS. Herein, the data sent by using the determined MCS may be retransmitted data (that is, data that needs to be retransmitted, for example, the first data), or may be newly transmitted data (that is, data sent for the first time).

It may be understood that the channel state information in this embodiment may be channel state information, or may have a broader meaning. For example, the channel state information may include at least one of the following information: a CQI, a PMI, a RI, a RSRP, a RSRQ, a path loss, a SRS SRI, a CSI-RS CRI, a RSSI, a PTI, a moving direction of a vehicle, an interference condition, and the like.

For example, in a possible implementation, the feedback information is a receiving response for the first data. When the first data is successfully received, the receiving response sent by the first terminal device is an ACK. When the indication information used to schedule the first data is successfully received but the first data is not successfully received, the receive response sent by the first terminal device is a NACK. When the indication information used to schedule the first data is not successfully received, and the first terminal device misses receiving the first data, the receive response sent by the first terminal device is DTX. It may be understood that, when the indication information used to schedule the first data is not successfully received, and the first terminal device misses receiving the first data, the first terminal device neither sends a positive acknowledgment nor sends a negative acknowledgment. In this case, if the second terminal device does not receive the positive acknowledgment or negative acknowledgment, the second terminal device may consider that the first terminal device sends discontinuous transmission. If the receive response sent by the first terminal device is a negative acknowledgment, after sending the feedback information to the second terminal device, the first terminal device may further receive the first data resent by the second terminal device.

In a possible implementation, the feedback information may include channel state information of a channel between the first terminal device and the second terminal device. After the first terminal device sends the feedback information to the second terminal device, the second terminal device may determine a modulation and coding scheme of data based on the channel state information included in the received feedback information, and send the data to the at least one terminal device based on the determined modulation and coding scheme. Further, the feedback information may further include the receiving response for the first data. If the receive response sent by the first terminal device is a negative acknowledgment, after sending the feedback information to the second terminal device, the first terminal device may further receive the first data that is resent by the second terminal device based on the determined modulation and coding scheme. Alternatively, if the receive response sent by the first terminal device is a positive acknowledgment, the first terminal device may further receive a negative acknowledgment sent by another terminal device that meets the feedback condition in the first terminal device set, and trigger the second terminal device to resend the first data based on the determined modulation and coding scheme.

It may be understood that the second terminal device may send data to a plurality of receiving terminal devices. The feedback condition is set, so that any receiving terminal device sends the feedback information only when the feedback condition is met. In this way, only some receiving terminal devices that meet the feedback condition can be controlled to send the feedback information, and not all receiving terminal devices need to send the feedback information. In this way, resource overheads and information redundancy caused when all receiving terminal devices in the communication group send the feedback information are effectively avoided.

In addition, the feedback information in this embodiment may be periodic feedback information, or may be aperiodic feedback information or semi-static feedback information. Herein, "periodic", "aperiodic", and "semi-static" are manners of sending the feedback information. The periodic feedback information means that once the first terminal device meets the feedback condition, the first terminal device starts to periodically send the feedback information at a specified time interval, until an indication that the second terminal device or the network device indicate the first terminal device not to send the feedback information is received. The aperiodic feedback information means that the first terminal device sends the feedback information only once after the first terminal device meets the feedback condition. The semi-static feedback information means that after the first terminal device meets the feedback condition, the first terminal device starts to periodically send the feedback information at a specified time interval. In addition, the first terminal device further continuously determines whether the feedback condition is met. Once it is determined that the feedback condition is no longer met, the first terminal device stops sending the feedback information. In a possible design, in a same communication group, if the feedback information is periodically sent, periods in which all first terminal devices (namely, receiving terminal devices) send the feedback information may be the same. In this way, when a period point arrives, only some first terminal devices that meet the feedback condition send the feedback information. Likewise, when an aperiodic or semi-static sending manner is used, after sending of the aperiodic feedback information or the semi-static feedback information is triggered, only some terminal devices that meet the feedback condition send the feedback information.

In a possible implementation, when the feedback condition is met, the first terminal device sends the feedback information to the second terminal device. Information that is used to trigger a feedback and that is involved in the feedback condition may be the same as content of the sent feedback information. Therefore, the second terminal device can more accurately learn of the channel condition of the first terminal device. For example, when the first terminal device sends the receive response to the second terminal device, the latest sent receive response needs to be a negative acknowledgment. Alternatively, when the first terminal device needs to send the channel state information to the second terminal device, the first channel state information needs to be less than or equal to the first threshold. Alternatively, the information that is used to trigger the feedback and that is involved in the feedback condition may be different from the sent feedback information. Therefore, applicability of the feedback method is effectively enhanced. For example, when the first terminal device sends the receive response to the second terminal device, the first channel state information needs to be less than or equal to the first threshold. Alternatively, when the first terminal device sends the channel state information to the second terminal device, the latest sent receive response needs to be a negative acknowledgment.

Step 303: The second terminal device receives feedback information from the at least one terminal device in the first terminal device set.

As described above, the first terminal device set is a set of all receiving terminal devices other than the second terminal device in a communication group including a receiving terminal device such as the first terminal device and a sending terminal device such as the second terminal device. The at least one terminal device is a receiving terminal device that meets the feedback condition in the first terminal device set.

Step 304: The second terminal device sends data to the terminal device in the first terminal device set based on the received feedback information.

In this embodiment, the second terminal device may receive the feedback information sent by the at least one terminal device that meets the feedback condition in the first terminal device set. In a possible implementation, the feedback information is a receiving response for the first data. After receiving the receive response sent by the terminal device that meets the feedback condition, the second terminal device may determine whether to resend the first data. If all received receive responses include a negative acknowledgment or discontinuous transmission, the second terminal device may resend the first data to the at least one terminal device. If all received receive responses are positive acknowledgments, the second terminal device may send new data to the at least one terminal device. In other words, if a receive response sent by any one of the at least one terminal device that meets the feedback condition is a negative acknowledgment or discontinuous transmission, the second terminal device may determine that the receiving terminal device fails to receive the first data. Therefore, the second terminal device may subsequently resend the first data.

In another possible implementation, the feedback information includes channel state information of a channel between the first terminal device and the second terminal device. After receiving the feedback information sent by the at least one terminal device that meets the feedback condition, the second terminal device may determine a MCS of subsequently to-be-sent data based on the channel state information included in the feedback information. When the channel state information fed back by the terminal device is relatively poor, the second terminal device may send the subsequent data by using an MCS with a relatively low rate. On the contrary, when the channel state information fed back by the terminal device is relatively good, the second terminal device may send the subsequent data by using an MCS with a relatively high rate. In this way, link adaptation is performed based on the channel state information fed back by the terminal device, to select an optimal modulation and coding scheme for subsequent data sending. In this way, a receiving effect of each terminal device in the first terminal device set is improved, so that all receiving terminal devices in the communication group can successfully receive the data sent by the second terminal device. Further, the feedback information may further include the receiving response for the first data. In this way, if the feedback information received by the second terminal device includes a negative acknowledgment or discontinuous transmission, the second terminal device may resend the first data to the terminal device in the first terminal device set by using the determined modulation and coding scheme.

In a multicast scenario, because the second terminal device sends a same piece of data to a plurality of receiving terminal devices, the plurality of receiving terminal devices correspondingly receive same content sent by the same second terminal device. Therefore, the second terminal device only needs to perform link adaptation based on channel state information of a link between the second terminal device and one terminal device that sends the feedback information in the receiving terminal devices, to determine the MCS.

In a possible design, the second terminal device may determine an MCS based on worst channel state information included in the received feedback information. In this way, it can be ensured that all receiving terminal devices in the communication group can well receive the data sent by the second terminal device subsequently. In another possible design, the second terminal device may further determine an MCS based on an average value of the channel state information included in the received feedback information. The average value of the channel state information may be an arithmetic average value or a geometric average value obtained through calculation by using the channel state information fed back by each receiving terminal device. In this way, it can be ensured that most receiving terminal devices in the communication group can well receive the data sent by the second terminal device subsequently. In yet another possible design, the second terminal device may further determine an MCS based on worst channel state information or an average value of channel state information in the feedback information that is sent by a terminal device whose latest sent receive response is a negative acknowledgment or who sends a receive response including a negative acknowledgment in previous first duration. Likewise, the average value of the channel state information may be an arithmetic average value or a geometric average value of the channel state information included in each piece of received feedback information.

In this embodiment, before the first terminal device determines whether the first terminal device meets the feedback condition, or before the second terminal device sends the first data to the terminal device in the first terminal device set, the network device or the second terminal device may further send fourth indication information to the terminal device in the first terminal device set. The fourth indication information is used to indicate the first terminal device in the first terminal device set to send the feedback information when the feedback condition is met. In other words, the network device or the second terminal device may control all receiving terminal devices in a communication group to send feedback information, or only a receiving terminal device that meets the feedback condition to send the feedback information. For any receiving terminal device, if the terminal device receives the fourth indication information used to indicate to send the feedback information when the feedback condition is met, it may be determined that the terminal device needs to determine whether the feedback condition is met, and further determine whether to send the feedback information. If the terminal device receives indication information used to indicate all receiving terminal devices in the communication group to send the feedback information, the terminal device may directly determine that the terminal device needs to send the feedback information. In a possible implementation, the fourth indication information and the indication information used to indicate that all the receiving terminal devices need to send the feedback information may be indicated by different values of a same indication bit, for example, 1 bit in one piece of signaling. When a value of the bit is 1, the bit indicates the fourth indication information, which indicates that a receiving terminal device sends feedback information only when the feedback condition is met. When a value of the bit is 0, the bit indicates that all receiving terminal devices in the communication group need to send the feedback information. The fourth indication information may alternatively be implemented in another manner, and examples are not listed one by one herein.

It may be understood that the second terminal device may indicate the receiving terminal device to send the feedback information only when the feedback condition is met. In this way, an effect of controlling that only some receiving terminal devices in the communication group need to send the feedback information can be implemented, and resource overheads and information redundancy caused when all the receiving terminal devices send the feedback information are avoided. In addition, the second terminal device may determine, based on the receiving response included in the received feedback information, whether to retransmit the data, and determine the MCS of the subsequent to-be-sent data based on the channel state information included in the received feedback information, so that each receiving terminal device can subsequently have a relatively good data receiving effect.

Figure 4:
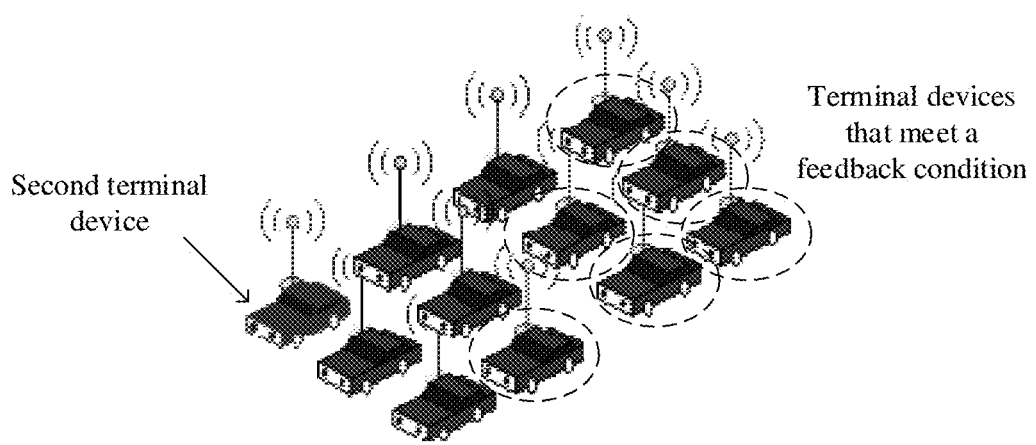
FIG. 4 shows a communication group according to an exemplary embodiment.

In an exemplary embodiment, the communication group shown in FIG. 4 includes 12 terminal devices, and each terminal device may be a vehicle. At a same moment, only one terminal device is a sending terminal device, and all other members in the communication group are receiving terminal devices. It may be understood that a sending terminal device in the communication group may change. For example, a sending terminal device at a moment is the second terminal device, and a sending terminal device at another moment may be another terminal device in the communication group. This is not limited in the embodiments.

For example, the feedback information sent by the terminal device includes the channel state information. At the current moment, the leftmost second terminal device in FIG. 4 is a sending terminal device, and all other terminal devices are receiving terminal devices. In all receiving terminal devices, only terminal devices in the dashed circles on the right need to send the feedback information because the terminal devices are relatively far away from the second terminal device, and a channel condition may be not good. Other terminal devices that are not circled do not need to send the feedback information because they are relatively close to the second terminal device and have a good channel condition. Even if the feedback information is sent, the second terminal device does not determine the MCS based on the channel state information included in the feedback information sent by the terminal devices. Therefore, if the terminal devices also send the feedback information, it can be a waste of resources.

Figure 5:
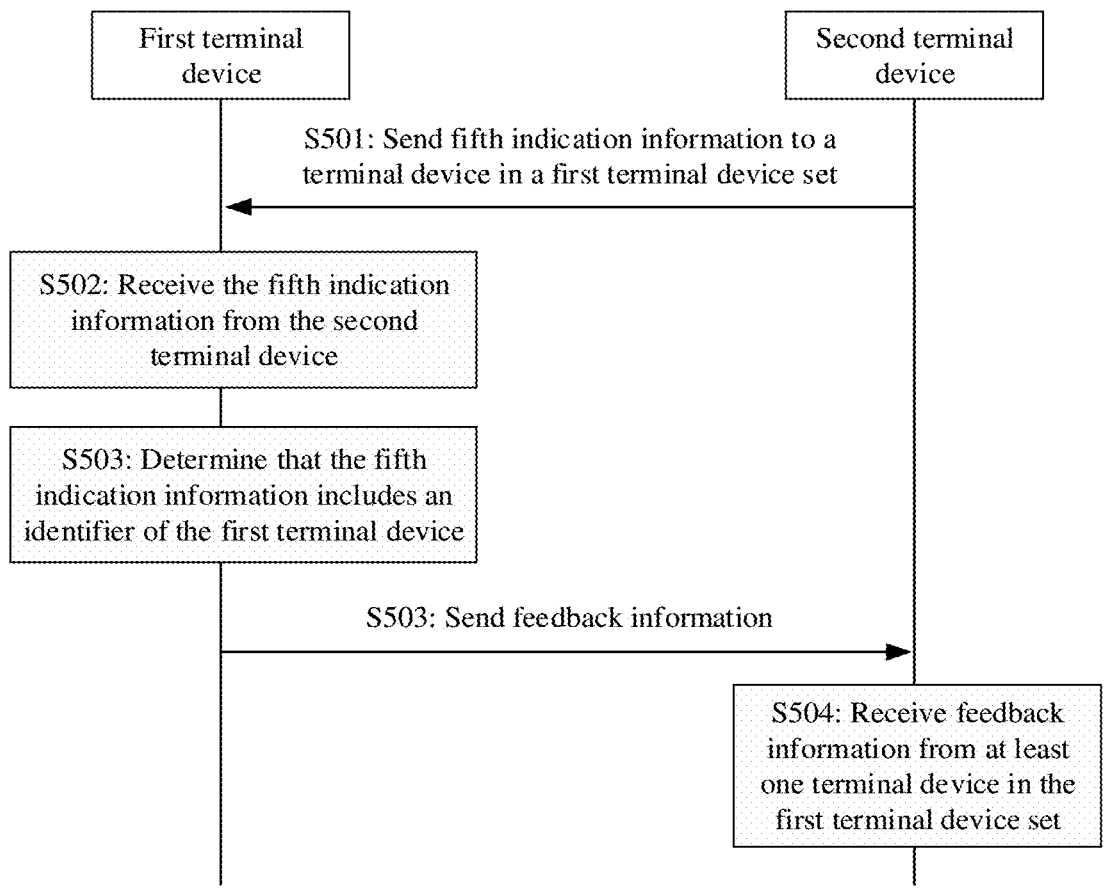
FIG. 5 is a schematic flowchart of another feedback method according to an embodiment.

FIG. 5 shows an example of another feedback method according to an embodiment. As shown in FIG. 5, the method may include the following step S501 to step S504.

Step S501: A second terminal device sends fifth indication information to a terminal device in a first terminal device set, where the fifth indication information includes an identifier of at least one terminal device in the first terminal device set, and is used to trigger the at least one terminal device to send feedback information to the second terminal device.

Similar to the foregoing method embodiment, the first terminal device is a receiving terminal device in a communication group, and the second terminal device is a sending terminal device in the communication group to which the first terminal device belongs. The communication group may include only one receiving terminal device, namely, the first terminal device, or may include one or more other receiving terminal devices, though this is not limited. A set of all receiving terminal devices in the communication group is referred to as the first terminal device set.

In this embodiment, the fifth indication information may include an identifier of at least one terminal device. Herein, the at least one terminal device specified in the fifth indication information is a terminal device that is in the first terminal device set and that needs to send the feedback information. Only a terminal device that receives the fifth indication information and whose fifth indication information includes an identifier of the terminal device needs to send the feedback information. A terminal device that does not receive the fifth indication information or whose received fifth indication information does not include an identifier of the terminal device does not need to send the feedback information.

FIG. 6 shows an example of an implementation of fifth indication information according to an embodiment. As shown in FIG. 6, in addition to an identifier of at least one terminal device that needs to send feedback information, the fifth indication information may further include a transmission resource separately corresponding to the at least one terminal device, so that each terminal device sends the feedback information on the corresponding transmission resource. The transmission resource in the embodiments may include at least one of the following time domain resources: a frequency domain resource, a code domain resource, a space domain resource, or a power domain resource, though this is not limited.

The fifth indication information may be broadcast by the second terminal device to all the receiving terminal devices in the first terminal device set, or may be separately sent by the second terminal device to at least one terminal device specified in the fifth indication information, that is, a terminal device whose identifier is included in the fifth indication information and that is in the first terminal device set. If the fifth indication information is sent to only the specified at least one terminal device, only the terminal device that receives the fifth indication information needs to send the feedback information, and a terminal device that does not receive the fifth indication information and a terminal device that receives other indication information used to indicate that no feedback information needs to be sent do not need to send the feedback information.

For example, the second terminal device may use a plurality of types of information such as an MIB carried on a PSBCH, an SIB, or RRC signaling (for example, an RRC IE), MAC signaling (for example, a MAC CE carried on a PSSCH), or physical layer signaling (for example, SCI carried on a PSCCH), to indicate the at least one terminal device to send the feedback information. Still further, in an exemplary application, the fifth indication information may also be sent by the network device. For example, the network device may use a plurality of types of information such as an MIB carried on a PBCH, an SIB, or RRC signaling, MAC signaling carried on a PDSCH, or physical layer signaling (for example, DCI carried on a PDCCH), to indicate the at least one terminal device to send the feedback information.

In this embodiment, before the second terminal device sends the fifth indication information, the second terminal device may further determine the at least one terminal device specified in the fifth indication information. The at least one terminal device specified in the fifth indication information may be determined by the second terminal device based on a channel state of a channel between the second terminal device and each terminal device in the first terminal device set. For example, in a possible design, the at least one terminal device may be a terminal device that is in the first terminal device set and whose first channel state information is less than or equal to a first threshold. A smaller value of the first channel state information indicates a poorer channel condition. The first channel state information may be a parameter, for example, a CQI, an RSRP, an RSRQ, or an RSSI, that is used to indicate a channel state condition. It may be understood that when the first channel state information is different parameters, first thresholds corresponding to the parameters may be the same or may be different, this is not limited in the embodiments.

Alternatively, in another possible design, the at least one terminal device may be a terminal device that is in the first terminal device set and whose second channel state information is greater than or equal to a second threshold. A larger value of the second channel state information indicates a poorer channel condition. For example, the second channel state information may be parameters, for example, a distance between the first terminal device and the second terminal device, a path loss, a moving direction of a vehicle, and an interference degree, that are used to indicate a channel state and/or channel interference. It may be understood that when the second channel state information is different parameters, second thresholds corresponding to all the parameters may be the same or may be different, this is not limited in the embodiments.

Alternatively, in another possible design, the at least one terminal device may be a terminal device that is in the first terminal device set and whose absolute value of a difference between channel state information and an average channel state information is less than or equal to a third threshold. In addition, the at least one terminal device may alternatively be a terminal device that is in the first terminal device set and whose sent receive response is a negative acknowledgment or discontinuous transmission.

For example, the at least one terminal device that is specified in the fifth indication information and that needs to send the feedback information may be a terminal device that meets any one or more of the following conditions:

a terminal device with worst channel state information included in feedback information received by the second terminal device latest, a terminal device whose channel state information included in the feedback information received by the second terminal device latest is close to average channel state information, a terminal device whose feedback information received by the second terminal device latest is a negative acknowledgment, a terminal device farthest from the second terminal device, and a terminal device having a largest path loss to the second terminal device.

Step S502: The first terminal device receives the fifth indication information from the second terminal device.

Step S503: The first terminal device determines that the fifth indication information includes an identifier of the first terminal device, and sends the feedback information to the second terminal device in response to the fifth indication information.

In this embodiment, before the first terminal device sends the feedback information, the second terminal device may further send the first data to the terminal device in the first terminal device set. In view of this, similar to the foregoing method embodiment, the feedback information sent by the first terminal device in this embodiment may include a receiving response for the first data and/or channel state information of a channel between the first terminal device and the second terminal device. An implementation of the receiving response for the first data and the channel state information of the channel between the first terminal device and the second terminal device may be the same as that in the foregoing method embodiment. Details are not described herein again. Likewise, the feedback information in this embodiment may also be periodically sent, aperiodically sent, or sent in a semi-static manner. Meanings and implementations of the periodic, aperiodic, and semi-static manners may be the same as those in the foregoing method embodiment. Details are not described herein again.

Step S504: The second terminal device receives the feedback information from the at least one terminal device in the first terminal device set.

In this embodiment, after receiving the feedback information sent by the at least one terminal device, the second terminal device may further send the data to the terminal device that is included in the first terminal device set. If the feedback information is the receiving response for the first data, or the feedback information includes the receiving response for the first data, that the second terminal device sends the data based on the received feedback information may include: determining whether to resend the first data or send new data, and determining an MCS of subsequent to-be-sent data based on the channel state information fed back by the first terminal device. Implementations of determining whether to resend the first data or send the new data and determining the MCS may be the same as those in the foregoing method embodiment. Details are not described herein again.

In this way, it may be understood that the second terminal device may explicitly indicate, by sending the fifth indication information, the terminal devices that need to send the feedback information, and the terminal devices that need to send the feedback information may be some receiving terminal devices in the communication group. Therefore, this effectively avoids resource overheads and information redundancy that are caused when all receiving terminal devices send feedback information.

Based on a same inventive concept, an embodiment may further provide a feedback apparatus. The feedback apparatus may be used as a first terminal device to implement a function of the first terminal device in any one of the foregoing method embodiments, or may be used as a second terminal device to implement a function of the second terminal device in any one of the foregoing method embodiments. FIG. 7 is a schematic structural diagram of a feedback apparatus according to an embodiment. As shown in FIG. 7, the feedback apparatus includes a transceiver module 710 and a processing module 720.

When the feedback apparatus serves as the first terminal device and performs the method embodiment shown in FIG. 3, the processing module 720 is configured to perform an operation of determining that a feedback condition is met, and the transceiver module 710 is configured to perform an operation of sending feedback information to a second terminal device or a network device when the processing module 720 determines that the feedback condition is met. When the feedback apparatus is used as the second terminal device and performs the method embodiment shown in FIG. 3, the processing module 720 is configured to perform an operation of sending, based on the received feedback information, data to a terminal device in the first terminal device set by using the transceiver module 710, and the transceiver module 710 is configured to perform an operation of receiving the feedback information from at least one terminal device in the first terminal device set.

When the feedback apparatus is used as the first terminal device and performs the method embodiment shown in FIG. 5, the transceiver module 710 is configured to perform an operation of receiving fifth indication information from the second terminal device, and the processing module 720 is configured to perform operations of determining that the fifth indication information includes an identifier of the first terminal device and sending the feedback information to the second terminal device by using the transceiver module 710. When the feedback apparatus serves as the second terminal device and performs the method embodiment shown in FIG. 5, the transceiver module 710 is configured to perform operations of sending the fifth indication information to the terminal device in the first terminal device set and receiving feedback information from at least one terminal device, and the processing module is configured to perform an operation of sending the data based on the received feedback information by using the transceiver module 710.

It may be understood that the feedback apparatus provided in this embodiment may be an entire system device of the terminal device, or may be a component in the device or a chip in the device. The processing module 720 in the feedback apparatus may be implemented by a processor or a processor-related circuit component, and the transceiver module 710 may be implemented by a transceiver or a transceiver-related circuit component.

FIG. 8 is another schematic structural diagram of a feedback apparatus according to an embodiment. As shown in FIG. 8, the feedback apparatus 800 includes a processor 810, a memory 820, and a transceiver 830. Optionally, the feedback apparatus 800 further includes an input device 840, an output device 850, and a bus 860. The processor 810, the memory 820, the transceiver 830, the input device 840, and the output device 850 are connected to each other by using a bus 860. The memory 820 stores instructions or programs, and the processor 810 is configured to execute the instructions or the programs stored in the memory 820. When the instructions or the programs stored in the memory 820 are executed, the processor 810 is configured to perform the operation performed by the processing module 720 in the foregoing embodiment, and the transceiver 830 is configured to perform the operation performed by the transceiver module 710 in the foregoing method embodiment.

It may be understood that the feedback apparatus 700 or 800 provided in this embodiment may correspond to the first terminal device that performs the feedback methods S301 to S304 provided in the embodiments, or may correspond to the second terminal device that performs the feedback methods S301 to S304 provided in the embodiments. Alternatively, the feedback apparatus 700 or 800 may correspond to the first terminal device that performs the feedback methods S501 to S504 provided in the embodiments, or may correspond to the second terminal device that performs the feedback methods S501 to S504 provided in the embodiments. In addition, operations and/or functions of the modules in the feedback apparatus 700 or 800 are respectively intended to implement corresponding processes of the method shown in FIG. 3 or FIG. 5. For brevity, details are not described herein again.

It may be understood that, the processor mentioned in the embodiments may be a central processing unit (CPU), the processor may further be another general purpose processor, a digital signal processor (DSP), an application specific integrated circuit (ASIC), a field programmable gate array (FPGA), or another programmable logical device, discrete gate or transistor logical device, discrete hardware component, or the like. The general purpose processor may be a microprocessor, or the processor may be any conventional processor or the like.

It may be understood that the memory mentioned in the embodiments may be a volatile memory or a nonvolatile memory, or may include a volatile memory and a nonvolatile memory. The nonvolatile memory may be a read-only memory (ROM), a programmable ROM (PROM), an erasable PROM (EPROM), an electrically EPROM (EEPROM), or a flash memory. The volatile memory may be a RAM, used as an external cache. Through example but not limitative description, many forms of RAMs may be used, for example, a static RAM (SRAM), a dynamic RAM (DRAM), a synchronous DRAM (SDRAM), a double data rate SDRAM (DDR SDRAM), an enhanced SDRAM (ESDRAM), a synchronous link DRAM (SLDRAM), and a direct rambus DRAM (DR RAM).

It may be understood that when the processor is a general purpose processor, a DSP, an ASIC, an FPGA or another programmable logic device, a discrete gate or a transistor logical device, or a discrete hardware component, the memory (a storage module) is integrated into the processor.

It may be understood that the memory described includes, but is not limited to, these and any memory of another proper type.

It may be understood that sequence numbers of the foregoing processes do not mean execution sequences in various embodiments. The execution sequences of the processes may be determined according to functions and internal logic of the processes, and should not be construed as any limitation on the implementation processes of the embodiments.

A person of ordinary skill in the art may be aware that, in combination with the examples described in the embodiments, units and algorithm steps may be implemented by electronic hardware or a combination of computer software and electronic hardware. Whether the functions are performed by hardware or software depends on particular applications and design constraint conditions of the solutions. A person of ordinary skill in the art may use different methods to implement the described functions for each particular application, but it should not be considered that the implementation goes beyond the scope of the embodiments.

It may be understood by a person of ordinary skill in the art that, for the purpose of convenient and brief description, for a detailed working process of the foregoing system, apparatus, and unit, refer to a corresponding process in the foregoing method embodiments. Details are not described herein again.

In the several embodiments provided, it may be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the solutions essentially, or the part contributing to the conventional technology, or some of the solutions may be implemented in a form of a software product. The computer software product is stored in a storage medium, and includes several instructions for instructing a computer device (which may be a personal computer, a server, or a network device) to perform all or some of the steps of the methods described in the embodiments. The foregoing storage medium includes: any medium that can store program code, such as a USB flash drive, a removable hard disk, a ROM, a RAM, a magnetic disk, or an optical disc.

The foregoing descriptions are merely implementations of the embodiments, but are not intended to limit the protection scope. Any variation or replacement readily figured out by a person of ordinary skill in the art within the scope disclosed shall fall within the protection scope of this application. Therefore, the protection scope of this application shall be subject to the protection scope of the claims.

What is claimed is:

1. A feedback method applied to a first terminal device, the method comprising:
    determining that a feedback condition is met, wherein the feedback condition is either that a latest sent receive response is a negative acknowledgment or a negative acknowledgment is sent within a first duration before feedback information is sent; and
    sending, after the feedback condition is met, the feedback information to a second terminal device or a network device, wherein the feedback information comprises both channel state information and a receive response, the receive response comprises selectively sending a positive acknowledgment, a negative acknowledgment, or a discontinuous transmission, and the feedback information is used to determine a modulation and coding scheme (MCS) used for data retransmission.

2. The method according to claim 1, wherein the feedback information comprises the receive response and before sending the feedback information to the second terminal device or the network device, the method further comprises:
    receiving first data from the second terminal device or the network device; and
    sending the feedback information to the second terminal device or the network device further comprises:
    when the first data is successfully received, sending the positive acknowledgment to the second terminal device or the network device;
    when the first data is not successfully received and a scheduling indication is successfully received, sending the negative acknowledgment to the second terminal device or the network device; and
    when the first data is not successfully received and a scheduling indication is not successfully received, sending the discontinuous transmission to the second terminal device or the network device.

3. The method according to claim 1, wherein the feedback information further comprises channel state information and after sending the feedback information to the second terminal device or the network device, the method further comprises:
    receiving data from the second terminal device or the network device, wherein the MCS of the data is determined based on the channel state information.

4. The method according to claim 1, wherein before sending the feedback information to the second terminal device or the network device, the method further comprises:
    receiving fourth indication information from the second terminal device or the network device, wherein the fourth indication information is used to indicate the first terminal device to send the feedback information when the feedback condition is met.

5. A method applied to a second terminal device, the method comprising:
    receiving, after a feedback condition is met, wherein the feedback condition is either that a latest sent receive response is a negative acknowledgment or a negative acknowledgment is sent within a first duration before feedback information is sent, the feedback information from at least one terminal device in a first terminal device set,
    wherein the feedback information comprises both channel state information and a receive response, the receive response comprises selectively sending a positive acknowledgment, a negative acknowledgment, or a discontinuous transmission, and
    wherein the second terminal device and the terminal device in the first terminal device set belong to a same communication group, and
    the feedback information is used to determine a modulation and coding scheme (MOS) used for data retransmission; and the method further comprises:
    sending data to the terminal device in the first terminal device set based on the feedback information.

6. The method according to claim 5, wherein the feedback information further comprises the receive response and before receiving the feedback information from the at least one terminal device in the first terminal device set, the method further comprises:
    sending first data to the terminal device in the first terminal device set.

7. The method according to claim 5, wherein the feedback information comprises the channel state information and sending the data to the terminal device in the first terminal device set further comprises:
determining the MCS of the data based on the channel state information comprised in the received feedback information; and
sending the data to the at least one terminal device in the first terminal device set based on the MCS.

8. The method according to claim 7, wherein determining the MCS of the data based on the channel state information comprised in the received feedback information further comprises:
determining the MCS based on worst channel state information or an average value of channel state information comprised in the received feedback information; or
determining the MCS based on the worst channel state information or an average value of channel state information comprised in feedback information that is sent by a terminal device whose latest sent receive response is the negative acknowledgment or who sends a receive response comprising the negative acknowledgment in a previous first duration.

9. The method according to claim 5, wherein, before receiving the feedback information from the at least one terminal device in the first terminal device set, the method further comprises:
sending fourth indication information to the at least one terminal device in the first terminal device set, wherein the fourth indication information is used to indicate the at least one terminal device to send the feedback information when the feedback condition is met.

10. A feedback apparatus, comprising:
a memory storage comprising instructions; and
one or more processors in communication with the memory storage, wherein the execution of the instructions by the one or more processors causes the apparatus to:
determine that a feedback condition is met, wherein the feedback condition is either that a latest sent receive response is a negative acknowledgment or a negative acknowledgment is sent within a first duration before feedback information is sent; and
send the feedback information to a second terminal device or a network device, wherein the feedback information comprises both channel state information and a receive response, the receive response comprises selectively sending a positive acknowledgment, a negative acknowledgment, or a discontinuous transmission, and the feedback information is used to determine a modulation and coding scheme (MCS) used for data retransmission.

11. The apparatus according to claim 10, wherein the feedback information comprises the receive response and the execution of the instructions by the one or more processors further causes the apparatus to:
receive first data from the second terminal device or the network device; and
when the first data is successfully received, send the positive acknowledgment to the second terminal device or the network device;
when the first data is not successfully received and a scheduling indication is successfully received, send the negative acknowledgment to the second terminal device or the network device; and
when the first data is not successfully received and a scheduling indication is not successfully received, send the discontinuous transmission to the second terminal device or the network device.

12. The apparatus according to claim 10, wherein the feedback information comprises the channel state information and the execution of the instructions by the one or more processors further causes the apparatus to:
receive data from the second terminal device or the network device, wherein the MCS of the data is determined based on the channel state information.

13. The apparatus according to claim 10, wherein the execution of the instructions by the one or more processors further causes the apparatus to:
receive fourth indication information from the second terminal device or the network device, wherein the fourth indication information is used to indicate the first terminal device to send the feedback information when the feedback condition is met.

14. A feedback apparatus, comprising:
a memory storage comprising instructions; and
one or more processors in communication with the memory storage, wherein the execution of the instructions by the one or more processors causes the apparatus to:
receive, after a feedback condition is met, wherein the feedback condition is either that a latest sent receive response is a negative acknowledgment, or the negative acknowledgment is sent within a first duration before feedback information is sent, the feedback information from at least one terminal device in a first terminal device set,
wherein the feedback information comprises both channel state information and a receive response, the receive response comprises selectively sending a positive acknowledgment, a negative acknowledgment, or a discontinuous transmission, and
wherein the feedback apparatus and the terminal device in the first terminal device set belong to a same communication group, and
the feedback information is used to determine a modulation and coding scheme (MOS) used for data retransmission; and
send data to the terminal device in the first terminal device set based on the feedback information by using the transceiver module.

15. The apparatus according to claim 14, wherein the feedback information comprises the receive response and the execution of the instructions by the one or more processors further causes the apparatus to:
send first data to the at least one terminal device in the first terminal device set.

16. The apparatus according to claim 14, wherein the feedback information comprises the channel state information and the execution of the instructions by the one or more processors further causes the apparatus to:
determine the MCS of data based on the channel state information comprised in the received feedback information, and
send the data to the at least one terminal device in the first terminal device set based on the MCS by using the transceiver module.

17. The apparatus according to claim 16, wherein the execution of the instructions by the one or more processors further causes the apparatus to:
determine the MCS based on worst channel state information or an average value of channel state information comprised in the received feedback information; or determine the MCS based on the worst channel state information or an average value of channel state information comprised in feedback information that is sent by a terminal device whose latest sent receive response is the negative acknowledgment or who sends a receive response comprising the negative acknowledgment in a previous first duration.

18. The apparatus according to claim 14, wherein the execution of the instructions by the one or more processors further causes the apparatus to:

send fourth indication information to the terminal device in the first terminal device set, wherein the fourth indication information is used to indicate the terminal device to send the feedback information when the feedback condition is met.

* * * * *